United States Patent [19]

Schwartz

[11] Patent Number: 4,560,130
[45] Date of Patent: Dec. 24, 1985

[54] TRACK BOLT FASTENER

[75] Inventor: Wesley W. Schwartz, Oshkosh, Wis.

[73] Assignee: Square D Company, Palatine, Ill.

[21] Appl. No.: 679,774

[22] Filed: Dec. 10, 1984

[51] Int. Cl.$^4$ ............................................. A47F 1/10
[52] U.S. Cl. ............................ 248/297.2; 248/220.2; 52/36
[58] Field of Search ...................... 52/36, 27, 282, 238, 52/239; 211/193, 190; 248/231.6, 297.2, 295.1, 220.2

[56] References Cited

U.S. PATENT DOCUMENTS

| 666,099 | 1/1901 | Kepler | 248/297.2 X |
|---|---|---|---|
| 963,000 | 6/1910 | Deihl | 248/295.1 |
| 2,345,650 | 4/1944 | Attwood | 52/710 X |
| 2,380,379 | 7/1945 | Attwood | 52/710 X |
| 2,744,714 | 5/1956 | Parke | 248/297.2 X |
| 4,008,872 | 2/1977 | Thompson | 52/27 X |
| 4,450,655 | 5/1984 | Rosenthal et al. | 52/36 |
| 4,508,300 | 4/1985 | Minick | 52/36 X |

Primary Examiner—Carl D. Friedman
Assistant Examiner—Creighton Smith
Attorney, Agent, or Firm—Stephen A. Litchfield; Richard T. Guttman

[57] ABSTRACT

A track bolt assembly for use in a medical application for supporting medical utility items on a track in a medical wall. The track bolt assembly comprises a bolt having a nut threaded thereon, said bolt having an opening at one end and a spring inserted in the opening. A compression pin adjacent the spring is held in the opening in the bolt by virtue of a threaded plug. The threaded plug having opening through which the pin projects to allow depression of the spring within the bolt opening. A support panel is disposed between the nut and a retaining member, said support panel designed to hold a utility item for medical purposes. The retaining member designed to interact with a rectangular shaped elongated track assembly such that when the retaining member is parallel to the track assembly the entire track bolt assembly and utility item may be mounted onto the medical wall or removed from the medical wall. The retaining member designed to be rotated within the rectangular track assembly such that when so rotated and the nut tightened onto the support panel pressure is created causing the entire bolt assembly and utility item to remain in the position to which it has been tightened.

13 Claims, 11 Drawing Figures

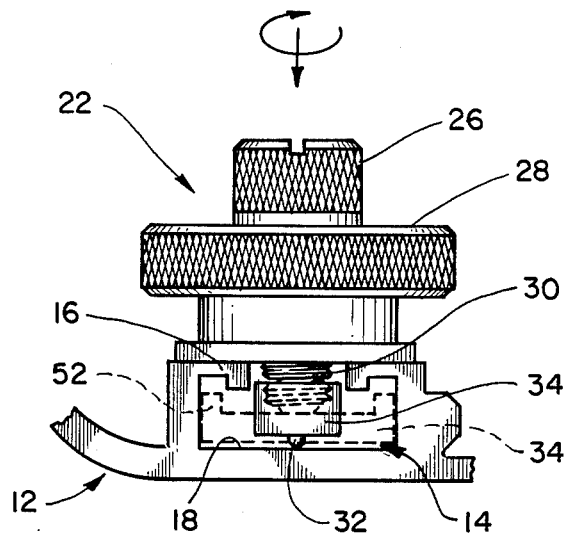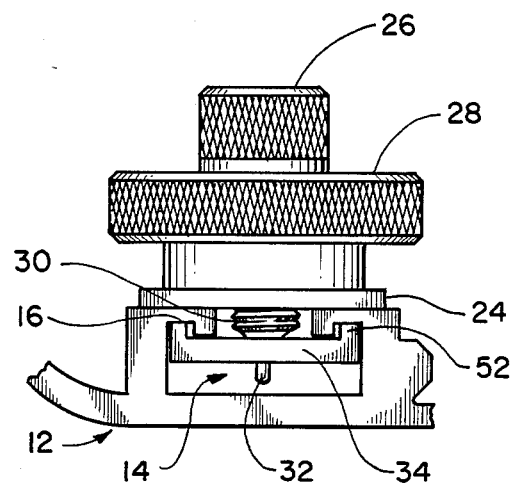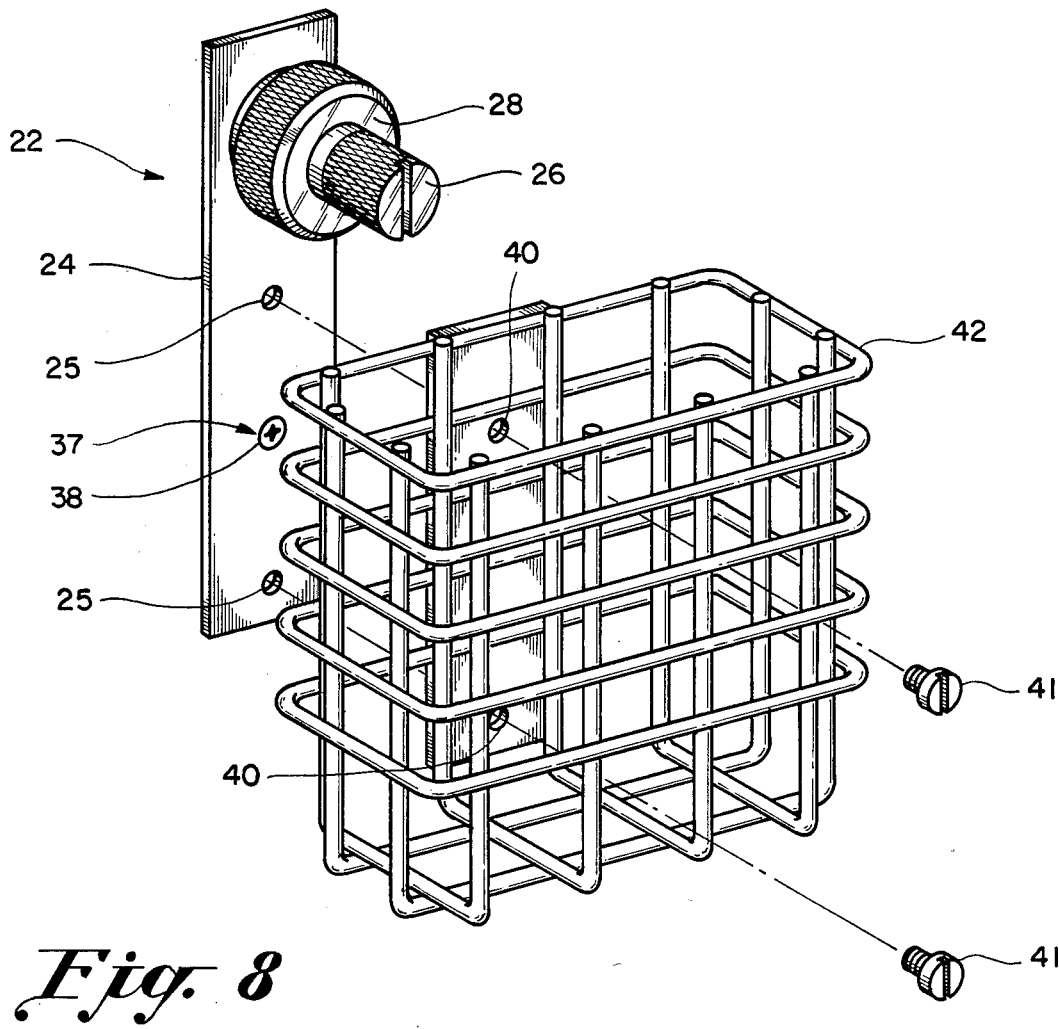

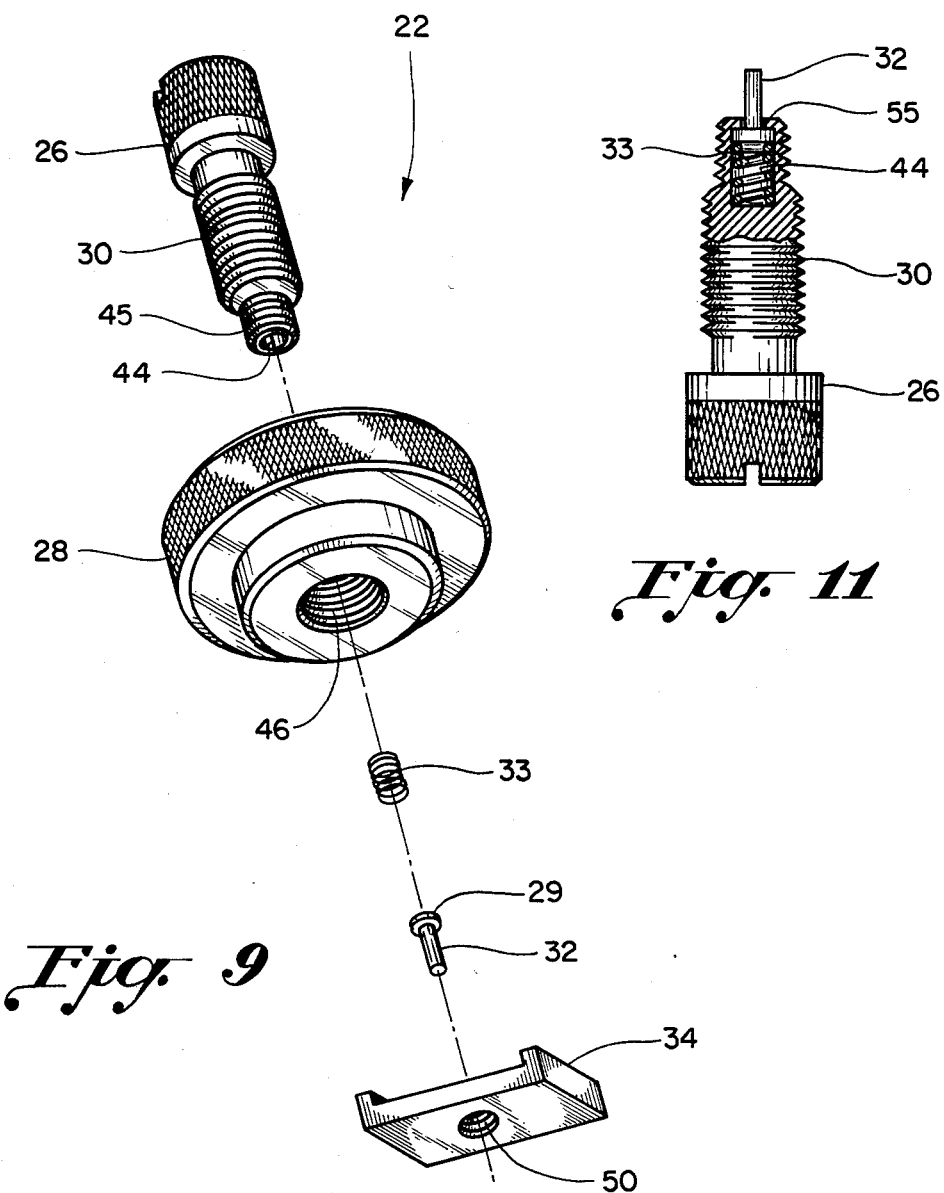
Fig. 9
Fig. 11
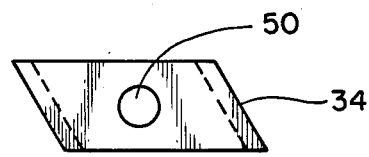
Fig. 10

TRACK BOLT FASTENER

BACKGROUND OF THE INVENTION

This invention relates to fasteners for track slide assemblies, and in particular, relates to fasteners which attach utility objects to a medical wall along a track integral with the wall. The invention further relates to track fasteners which are moveable along the track and can be adjusted to varying positions on the track assembly on the wall.

Prior art fasteners in the past have comprised a elongated track integrally formed or attached to a wall. The track has a generally rectangular inner shape with an elongated opening extending therefrom. A bolt assembly is disposed within the rectangular opening of the track and extends through the elongated opening allowing for a utility item such as a light, a basket, or arm support to be connected to the bolt and retained on the wall by virtue of the bolt and track. In most applications, loosening the bolt allows the utility item mounted thereon to be moved along the track to varying positions. In the past, the bolt and hence utility item was mounted on the track through a single enlarged area in the elongated opening. This enlarged area permitted the bolt assembly to be placed in the rectangular area of the track for movement up and down the track. Since the walls of the rectangular area adjacent the elongated opening were not wide enough to permit the bolt assembly to pass through, the bolt assembly would be captively held within the track, except when it was at the single enlarged area. While this permitted the bolt assembly to be moved to various positions along the track, it did mean that in order to remove the bolt assembly from the track the bolt assembly had to first be moved to the enlarged opening.

In medical wall applications where the track assembly is mounted on a medical wall containing numerous other medical devices, a typical application of the prior art track bolt assemblies would comprise a single track having numerous bolt assemblies mounted therein. Movement of one bolt assembly with respect to another along the same track wall is allowable so long as the bolt assemblies were spaced with respect to one another. Due to the captive holding of the bolt assembly within the rectangular area of the track, the only way the bolt assemblies could be switched, removed, or otherwise moved outside of the space between the individual bolt assemblies was to move each bolt assembly to the enlarged opening of the track and remove each one individually. Thus, if there were four track bolt assemblies on a single track with the enlarged opening on the track at the bottom of the track beneath the last mounted bolt assembly, and one desires to remove the first mounted bolt assembly, all three other track bolt assemblies had to first be removed through the enlarged opening before the first mounted track bolt assembly could be removed.

In medical wall applications, particularly in emergency rooms and other intensive care patient areas, this procedure can become time consuming and distracting for the medical staff. Also, since various types of utility medical items are mounted on each bolt assembly, if one item was needed to be moved over another and was not in the proper position due to the mounting of other bolt assemblies beneath it, the entire assembly would have to be removed from the track before the individual utility item could be adjusted. This entails a great inconvenience to medical personnel and hampers the effectiveness of the track assembly concept in medical applications.

Thus, there is a need in the field for a track bolt assembly which may be mounted directly onto the rectangular portion of the track without the need for the bolt assembly to be placed first in an enlarged opening in the track. Further, there is a need in the field for a track bolt assembly that will be removeable from the track without first moving the bolt assembly to an enlarged opening. Further, there is a need in the field for such a removeable bolt assembly that still has the ability to move within the rectangular opening of the track to adjust to varying locations on the track.

SUMMARY OF THE INVENTION

It is an object of the present invention to provide a track bolt fastener and assembly that will be mountable directly onto the track, at any point on the track, without the need for first using an enlarged, mounting opening at a predesignated area on the track.

It is another object of the present invention to provide a bolt assembly for a track which will allow the assembled bolt assembly to be removed from the track without first moving it to the enlarged opening through which the assembly was mounted. It is a further object of the present invention to provide such a removeable bolt assembly which is moveable along the length of a track without the need to remove it from the track, and which can be tightened on the track to remain at a predetermined location.

The objects of the present invention are met by providing a track bolt assembly having a support panel for supporting a utility object mounted thereon, and an elongated bolt disposed through the support panel. Mounted on the bolt at one end of the panel is a nut turnable on threads provided by the bolt. The nut is turnable to extend a force against the support panel. The bolt extends through the support panel and to the opposite side thereof where threaded thereon is a bolt retaining member designed to interact with the rectangular portion of the track. The bolt has a spring loaded pin at one end adjacent the bolt retaining member designed to allow the bolt to be pressed against the inner wall of the rectangular portion of the track to disengage the retaining member from the rectangular section. Once disengaged, the retaining member may be moved 90 degrees to allow its removal from the rectangular track assembly. The retaining member has a width less than that of the elongated opening in the rectangular section of the track. Thus, when the retaining member is parallel to the elongated opening in the track, the entire bolt assembly including the support panel may be attached to the track by simply inserting the retaining member in the elongated opening, pushing the bolt and hence, the spring loaded pin, against the back of the track, thereby allowing the retaining member to clear the upper ends of the rectangular opening and twisting the bolt assembly 90 degrees to interlock the retaining member with the rectangular walls of the track opening. By tightening the nut against the support panel, the retaining member is drawn tightly against the end walls of the rectangular area of the track, thereby securing the bolt assembly and hence any utility item connected thereto to the track on the wall.

To move the track bolt assembly along the track, for adjustment of the positioning of the utility item mounted thereto, the nut is simply loosened thereby alleviating the pressure maintained against the retaining member by the nut and the support panel and allowing the bolt assembly to move along the rectangular portion of the track. The spring loaded pin helps keep the retaining member in the track when the bolt assembly is being moved by keeping the retaining member adjacent the outer walls of the track unless the spring force of the bolt is overcome. Once the bolt assembly has been moved to its desired position the nut is retightened and the track bolt assembly will maintain that position.

To remove the bolt assembly from the elongated rectangular track, the nut is unscrewed to create the retaining member to clear the outer walls of the rectangular area of the track. The bolt then is pushed into the track area thereby depressing the spring loaded pin and providing additional room necessary for the retaining member to clear the outer walls of the rectangular opening. The bolt is then turned 90 degrees thereby aligning the retaining member with the elongated opening in the track. Since the width of the retaining member is less than the width of the elongated opening in the track, the entire bolt assembly and hence the medical utility item secured thereto may be removed from the track in the wall. Thus, it is seen that the subject invention provides means by which a track bolt assembly and hence utility item may be mounted at any portion along a track on a wall. Also, the subject invention provides means by which a bolt assembly may be moved along the track, and secured at any point along the track. Also, the subject invention provides means by which the bolt assembly may be removed from any portion of the track on the wall.

DESCRIPTION OF THE DRAWINGS

The features of the present invention which are believed to be novel are set forth with particularity in the appended claims. The invention together with further objects and advantages thereof may best be understood by reference to the following description taken in conjunction with the accompanying drawings, in the several figures of which like reference numerals identify like elements and in which:

FIG. 6 illustrates in greater detail the components of the bolt assembly shown mounted in a portion of the track.

FIG. 7 shows the track bolt assembly interlocked with a portion of the track.

FIG. 8 illustrates the track bolt assembly in perspective view showing a utility component, a medical basket, to be secured thereto.

FIG. 9 illustrates the components of the bolt assembly in exploded view.

FIG. 10 illustrates the end view of the retaining member.

FIG. 11 illustrates a partial section view of the assembled bolt.

DETAILED DESCRIPTION

Figure 1:
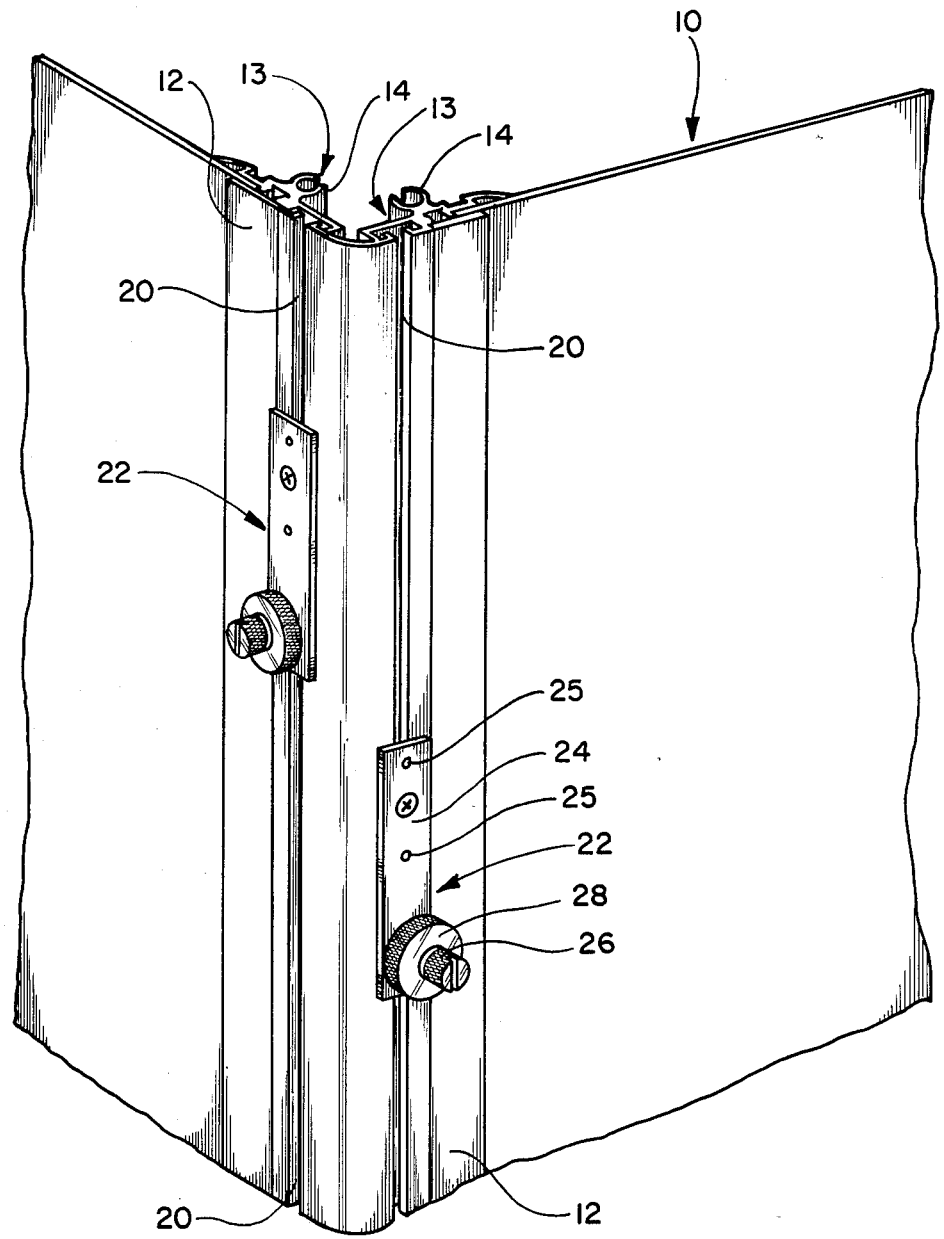
FIG. 1 is a perspective view of the track bolt assembly showing a pair of track bolts mounted on a parallel pair of tracks on a medical wall.

The invention will now be described in more detail. Medical wall 10 is shown in FIG. 1 having track assembly 12 mounted thereon. It is seen that track assembly 12 comprises two elongated tracks 13 having an elongated opening 20. Track assembly 12 has rectangular track area 14 running the length thereof. Track bolt assembly 22 is shown mounted in the rectangular track area 14 on each of the elongated tracks 13 shown in FIG. 1. Support panel 24 is shown parallel and adjacent the elongated opening 20 of rectangular track area 14. Track bolt assemblies 22 are shown in varying positions along the rectangular track area 14 on medical wall 10. Bolt 26 is shown connected through circular nut 28 on the outer side of support panel 24. Support panel 24 has mounting holes 25 drilled therethrough which are threaded and allow the connection of a medical utility device (such as shown in FIG. 8) to be mounted to the track support panel 24. For purposes of illustrating the subject invention, the utility device normally attached to the support panel 24 is not shown in FIG. 1.

Figure 2:
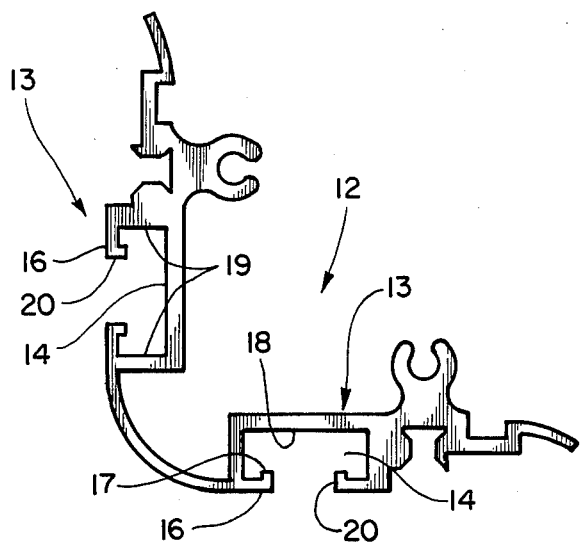
FIG. 2 shows from top view the track used in most medical walls.

FIG. 2 shows in top view the track assembly 12 which interlocks with walls 10 to form a curved portion, or corner portion of a medical wall. Track assembly 12 is shown with the elongated tracks 13 and rectangular track areas 14. The rectangular track area 14 has retaining walls 16 on each end of elongated opening 20. Rectangular track area 14 has inner wall 18 and side walls 19. the other components shown on track assembly 12 cooperate with portions of the wall assembly for mounting the walls to the track assembly 12 and securing other medically related components thereto.

Figure 3:
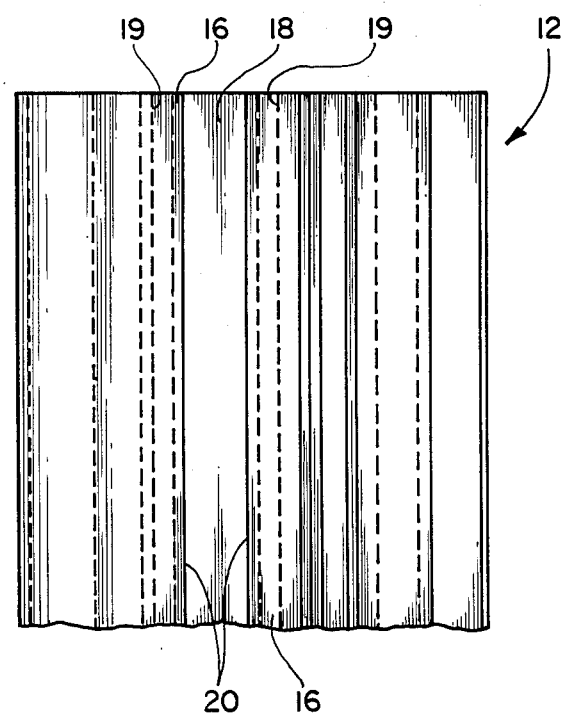
FIG. 3 shows a front view of the track used in most medical walls.

FIG. 3 illustrates the track assembly 12 in front view. Elongated opening 20 through which the bolt assembly is inserted is shown along with the inner wall 18 of rectangular track area 14. Side walls 19 form the inner area of the rectangular track area 14 and connect with retaining walls 16.

Figure 4:
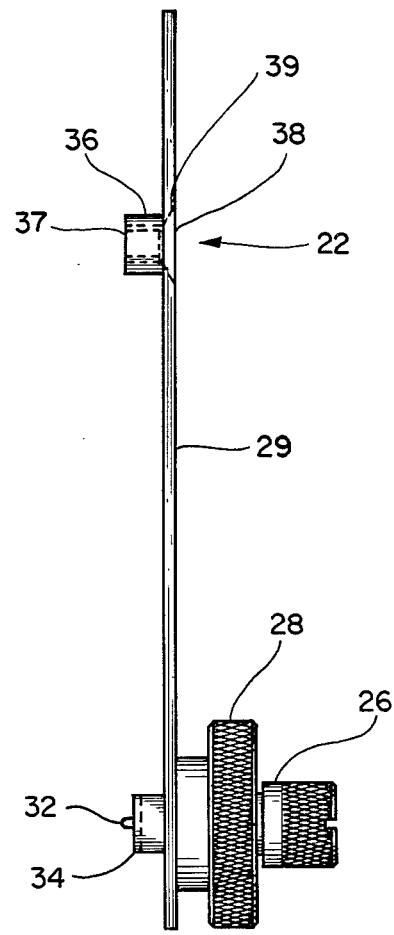
FIG. 4 illustrates the track bolt fastener shown in side view, the track bolt fastener generally to be fitted to the track shown in FIGS. 2 and 3.
Figure 5:
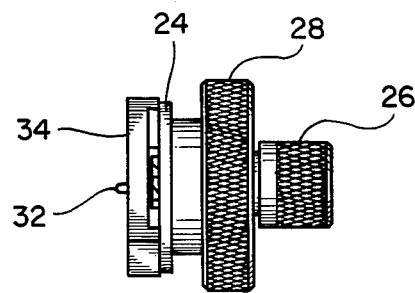
FIG. 5 illustrates the bolt assembly in side view.

FIG. 4 shows in side view the track bolt assembly 22. Support panel 24 is shown disposed between bolt retaining member 34 and bolt 26. Nut 28 is threaded over bolt 26 such that it is adjacent support panel 24. When nut 28 is tightened over the threads on bolt 26, the support panel 24 is compressed against bolt retaining member 34. Guide 36 has opening 37 therein which is threaded to receive guide screw 38. Beveled opening 39 is drilled in support panel 24 to receive guide screw 38 such that it rests flat with the outer surface of support panel 24. Guide 36 is held in place with respect to support panel 24 such that it will fit within elongated opening 20 in track 12 thereby steadying the track bolt assembly 22 in the rectangular track area 14. Spring loaded pin 32 is shown formed adjacent the end of bolt 26 such that it extends past the outer end of bolt retaining member 34. Spring 33 (shown in FIG. 9) is loaded between pin 32 and bolt 30 such that pin 32 may be compressed into the end of bolt 26 when bolt 26 is pressed into rectangular track area 14 and against the inner wall 18 of the track area 14. The bolt retaining member 34 is joined to the bolt 26 such that when the bolt 26 is rotated the retaining member 34 rotates with it. Support panel 24 is anticipated to be manufactured of a piece of sheet steel drilled with openings at various points to accept the bolt 26, the guide screw 38, and the utility item shown in FIG. 8.

FIG. 6 illustrates threads 30 of bolt 26 upon which nut 28 is threaded. FIG. 6 shows in solid line the positioning of retaining member 34 prior to its rotation 90 degrees to interlock it into the rectangular track area of track assembly 12.

Retaining member 34 is also shown in dotted line in FIG. 6 after its rotation 90 degrees into rectangular area 14. It is seen that the C-shaped members 52 of retaining member 34 interlock with the retaining walls 16 of track 12. This interlocking is better shown in FIG. 7. Once interlocked, nut 28 is turned on threads 30 such that it creates a pressure against support plate 24 which is resting against the outer edge of retaining walls 16. This force draws retaining member 34 into the innertrack areas of retaining walls 16. Once nut 28 is tightened to its fullest extent, the bolt assembly 22 remains in the position that it is located on track 12. To move the bolt assembly 22 with respect to the track 12, nut 28 is loosened and the entire assembly is then free to slide along the elongated track 12. Once a new position is reached on the track 12, the nut 28 is again tightened thereby causing bolt retaining member 34 to press against retaining wall 16 and maintain its position on the track 12. To remove the entire track bolt assembly 22 from the track 12, the nut 28 is loosened to allow the bolt 26 to be pushed inward towards the inner wall 18 of rectangular track area 14. This is shown in FIG. 6. Retaining member 34 is shown in dotted line as it is moved towards inner wall 18. It should be noted that pin 32 is pressed against inner wall 18 and that the spring force of pin 32 is overcome by applying a greater force on bolt 26 in the direction of inner wall 18. Once the C-shaped members 52 of bolt retaining member 34 have cleared the indentations of retaining wall 16, the bolt 26 may be rotated 90 degrees thereby rotating the bolt retaining member 34 as shown in solid line in FIG. 6. This now allows the retaining member 34 to move past the elongated opening 20 in track assembly 12 and enables the entire bolt assembly 22 to be removed from the track 12. It is seen therefore that by simply pushing in bolt 26 and rotating it 90 degrees after nut 28 has been loosened, the track bolt assembly 22 may be removed from the track 12 at any point along the track. No special openings or other arrangements are necessary for removing or installing the track bolt assembly 22 to a position on the track. This enables the bolt to be removed without first removing other items on the same track.

FIG. 8 illustrates the tract bolt assembly 22 with utility item, basket 42, shown in exploded view to be attached thereto. This basket is typically of the type used in medical applications to hold medical apparatus and other items near a patient care area. It is seen that screws 41 connect through openings 40 to threaded openings or mounting holes 25. Guide screw 38 is shown disposed in opening 37 to hold guide 36 in place. Guide 36 rests within opening 20 of track 12 thereby preventing the support panel 24 from rotating with respect to the anchoring position formed by the retaining member 34 and the retaining walls 16.

FIG. 9 illustrates in exploded view the components of the bolt assembly 22 except for the support panel 24, which has been omitted to give a better view of the assembly of the track bolt components. Support panel 24 would fit between the nut 28 and the retaining member 34. FIG. 9 otherwise shows bolt 26 disposed to be placed within threaded opening 46 of nut 28. Bolt 26 has threaded portion 30 designed to mate with the threaded portion of opening 46 in nut 28. Spring 33 is loaded into opening 44 of bolt 26 and is compressed by pin 32. Pin 32 has the stop portion 29 located thereon which is also received into opening 44 of bolt 26. Pin 32 is held in opening 44 of bolt 26 by swaging the outer end of opening 44 after pin 32 is inserted. This swaging operation contains the pin 32 in opening 44, yet allows relative movement of the pin 32 against spring 33. A sectional view of the bolt 26 with the pin 32 and the spring 33 assembled therein is shown in FIG. 11. Note the ends 55 of bolt 26 are compressed around pin 32, after the swaging operation. Referring back to FIG. 9, retaining member 34 is threaded onto threaded area 45 at threaded opening 50. When assembled, the bolt apparatus has pin 32 extending a small distance past opening 50 and retaining member 34. This allows the end of pin 32 to interact with the inner wall 18 of track 14.

FIG. 10 shows retaining member 34 in an end view. Retaining member 34 has opening 50 therein and is shown having four parallel ends. Opposing ends of retaining member 34 are slanted as shown to allow the rotation of retaining member 34 within track 14 such that the rotation will not interfere with or strike side walls 19 of rectangular track area 14.

The invention is not limited to the particular details of construction of the device depicted and other modifications and applications are contemplated. For example, the shape of retaining member 34 or of the C-shaped members 52 shown in FIG. 9 could be somewhat different. The important point is that this shape is sufficient to interlock with the retaining wall 16 of rectangular track area 14. Also, the bolt 26 shape could be other than that shown. Further, other means than the swaging operation above described could be employed to retain the pin 32 within the opening 44. For example, a retaining nut could be threaded into opening 44 through which pin 32 would project, but which would not allow the stop 29 to pass through. Certain other changes may be made in the above described device without departing from the true spirit and scope of the invention herein involved. It is intended therefore that the subject matter in the above depiction shall be interpreted as illustrative and not in a limiting sense.

I claim:

1. Apparatus for moveably mounting a utility item along a track, said apparatus comprising:

a bolt having an outer threaded portion at one end;

an opening in said threaded end; a pin moveably mounted in said opening; a spring disposed between the pin and the bolt in said opening such that said spring constantly urges the pin out of the opening; means for maintaining said pin in said opening;

a relatively planar support panel having an opening for receiving the bolt therethrough and means for mounting said utility item thereto;

a retaining member threaded onto the outer threads of the bolt on one side of the support panel; a nut threaded onto the outer threads of the bolt on the other side of the support panel;

a track having an inner area and an outer elongated opening joining the inner area; such that said retaining member is insertable at any point on the track through the elongate opening and turnable with said bolt by compressing the bolt and pin against an inner wall of the inner track area to engage the inner track area with the retaining member, such that when so engaged the nut may be tightened against the other end of the support panel thereby tightening the support panel to the track and causing the entire assembly to remain on the track at a predetermined location.

2. The apparatus of claim 1 where the retaining member has a length and a width and where said length is greater than said width and where said elongate opening has a length and a width, said length being greater than said width and where the width of the retaining member is less than the width of the elongate opening and where the length of the retaining member is greater than the width of the elongate opening.

3. The apparatus of claim 2 where the retaining member has a front planar shape in the form of a parallelogram and where the retaining member is joined to the outer threaded portion of the bolt such that turning the bolt turns the retaining member.

4. The apparatus of claim 2 where the retaining member has at each of its lengthwise opposite ends an abutment and where the inner track area has at its end adjacent the elongate opening means for engaging the abutments of the retaining member such that when said retaining member is turned in said inner track area the retaining member interlocks with the abutment engaging means.

5. The apparatus of claim 1 where the inner track area has a substantially rectangular cross-sectional shape and an inner wall and an outer wall and where said elongate opening is along the outer wall.

6. The apparatus of claim 5 where the pin in said bolt assembly may be compressed against the inner track wall to provide room for the retaining member to clear the outer wall of the track area when said retaining member is being turned in said inner track area.

7. The apparatus of claim 1 where the support panel has mounted thereon and spaced from the opening to receive the bolt assembly a guide protrusion to be received in said elongate opening thereby preventing the support panel from turning about the bolt when the assembly is engaged in the inner track area.

8. Apparatus for moveably mounting a utility item along a track, said apparatus comprising:
   a bolt having an outer threaded portion at one end;
   a relatively planar support panel having an opening for receiving the bolt therethrough and means for mounting said utility item thereto;
   a retaining member having a length and width threaded onto the outer threads of the bolt on one side of the support panel; a nut threaded onto the outer threads of the bolt on the other side of the support panel, said retaining member having at each of its lengthwise ends an abutment;
   a track having an inner area and an outer elongated opening joining the inner area; said inner track area having adjacent the outer elongated opening means for engaging the abutments of the retaining member such that said retaining member is insertable at any point on the track through the elongate opening and turnable with said bolt by compressing the bolt and to engage the inner track area at the abutment engaging means and such that when so engaged the nut may be tightened against the other end of the support panel thereby thightening the support panel to the track and causing the entire assembly to remain on the track at a predetermined location.

9. The apparatus of claim 8 where the retaining member has a length and a width and where said length is greater than said width and where said elongate opening has a length and width, said length being greater than said width and where the width of the retaining member is less than the width of the elongate opening and where the length of the retaining member is greater than the width of the elongate opening.

10. The apparatus of claim 9 where the retaining member has a front planar shape in the form of a parallelogram and where the retaining member is joined to the outer threaded portion of the bolt such that turning the bolt turns the retaining member.

11. The apparatus of claim 8 where the inner track area has a substantially rectangular cross sectional shape and an inner wall and an outer wall and where said elongate opening is along the outer wall.

12. The apparatus of claim 11 where the bolt has an opening at the threaded end thereof; a pin moveably mounted in the opening; a spring disposed between the pin and the bolt in the opening such that said spring constantly urges the pin out of the opening and means for maintaining the pin in the opening, such that the bolt and pin assembly may be compressed against the inner track wall to provide room for the retaining member to clear the outer wall of the track area when said retaining member is being turned in said inner track area.

13. The apparatus of claim 8 where the support panel has mounted thereon and spaced from the opening to receive the bolt assembly a guide protrusion to be received in said elongate opening thereby preventing the support panel from turning about the bolt when the assembly is engaged in the inner track area.

* * * * *